(12) United States Patent
Buckman (10) Patent No.: US 9,589,483 B2
(45) Date of Patent: Mar. 7, 2017

(54) SYSTEM FOR SIMULATING DIAGNOSTIC FEATURES OF TENSION PNEUMOTHORAX AND CARDIAC TAMPONADE WITHIN A MEDICAL TRAINING MANIKIN

(71) Applicant: Operative Experience, Inc., North East, MD (US)

(72) Inventor: Robert F. Buckman, Elkton, MD (US)

(73) Assignee: OPERATIVE EXPERIENCE, INC., North East, MD (US)

( * ) Notice: Subject to any disclaimer, the term of this patent is extended or adjusted under 35 U.S.C. 154(b) by 144 days.

(21) Appl. No.: 14/209,341

(22) Filed: Mar. 13, 2014

(65) Prior Publication Data

US 2014/0272880 A1    Sep. 18, 2014

Related U.S. Application Data

(60) Provisional application No. 61/785,454, filed on Mar. 14, 2013.

(51) Int. Cl.
  *G09B 23/28*  (2006.01)
(52) U.S. Cl.
  CPC ........... *G09B 23/28* (2013.01); *G09B 23/288* (2013.01)
(58) Field of Classification Search
  CPC ........ G09B 23/26; G09B 23/28; G09B 23/30; G09B 23/303; G09B 23/32; G09B 23/34; G09B 23/281; G09B 23/282; G09B 23/283; G09B 23/285; G09B 23/286; G09B 23/288

See application file for complete search history.

(56) References Cited

U.S. PATENT DOCUMENTS

| 5,061,188 | A | 10/1991 | McCollum | |
| 2008/0227073 | A1* | 9/2008 | Bardsley | G09B 23/30 434/267 |
| 2011/0287398 | A1* | 11/2011 | Blackburn | G09B 23/285 434/267 |
| 2012/0034587 | A1 | 2/2012 | Toly | |

FOREIGN PATENT DOCUMENTS

WO    WO-2012/075170 A1    6/2012

OTHER PUBLICATIONS

Search Report dated Oct. 17, 2014, received in corresponding European Application No. 14159393, 5 pages.

* cited by examiner

*Primary Examiner* — Timothy A Musselman
(74) *Attorney, Agent, or Firm* — Foley & Lardner LLP (57) ABSTRACT

A system is configured to selectively and reversibly simulate diagnostic features of tension pneumothorax and cardiac tamponade. the system is configured to simulate deviation of the trachea. the system is configured to simulate jugular vein distension.

34 Claims, 2 Drawing Sheets

FIG. 1

FIG 2 ized side produces the third characteristic finding of tension pneumothorax, namely the absence of audible breath sounds in the affected side of the chest. These findings, in association with a fall in blood pressure and cardiac output, and an increased heart rate and weakened pulse constitute the usual diagnostic features for tension pneumothorax.

SYSTEM FOR SIMULATING DIAGNOSTIC FEATURES OF TENSION PNEUMOTHORAX AND CARDIAC TAMPONADE WITHIN A MEDICAL TRAINING MANIKIN

CROSS-REFERENCE TO RELATED APPLICATIONS

This application claims the benefit of and priority to U.S. Application No. 61/785,454, filed Mar. 14, 2013, the entirety of which is incorporated by reference herein.

BACKGROUND OF THE INVENTION

Field of the Invention

This disclosure relates to systems for simulating the diagnostic features of tension pneumothorax and cardiac tamponade, and more particularly, systems for simulating the diagnostic features of tension pneumothorax and cardiac tamponade within a medical training manikin.

Description of Related Art

Manikins are often used in the medical profession as simulation aids for training nurses, doctors and medics to perform diagnostic and therapeutic procedures. Multiple different types of manikins are used in patient care training courses on topics such as Basic Life Support (BLS), Advanced Cardiac Life Support (ACLS), Advanced Trauma Life Support (ATLS), Pediatric Advanced Life Support (PALS) and Pre-hospital Trauma Life Support (PHTLS). In all of these courses involving emergency interventions for life support, an important element is training in the diagnosis and management of tension pneumothorax and cardiac tamponade (sometimes termed pericardial tamponade).

Tension pneumothorax is a major cause of death in civilian trauma victims, in combat casualties, and in critically ill, hospitalized patients such as those in intensive care units. The condition affects patients of all ages from neonates to the very elderly. It most commonly occurs when there is a leakage of air from the surface of an injured lung that cannot escape through the chest wall. A buildup of pressure outside the lung, but inside the chest cavity, causes pressure on the lung and on the large veins within the chest. The pressure on one side of the chest displaces the structures in the mediastinum which separates the two pleural cavities of the thorax. The trachea, which lies in the mediastinum is displaced away from the pressurized side causing a characteristic diagnostic finding, namely tracheal deviation. The pressure on the major veins within the mediastinum interferes with filling of the heart, causing a progressive drop in blood pressure and eventual cardiac arrest. The drop in blood pressure is associated with acceleration in the heart rate triggered by a reflex in an effort to overcome subnormal filling pressure of the heart. In other words, the heart pumps at an accelerated rate but with a subnormal volume ejected for each cardiac contraction.

Pressure on the major veins within the mediastinum also blocks the blood from the neck veins that normally flows into the large veins of the chest. This obstruction produces a characteristic diagnostic finding of distention of the veins in the neck.

The pressure-induced collapse of the lung on the pressurized side produces the third characteristic finding of tension pneumothorax, namely the absence of audible breath sounds in the affected side of the chest. These findings, in association with a fall in blood pressure and cardiac output, and an increased heart rate and weakened pulse constitute the usual diagnostic features for tension pneumothorax.

A second lethal condition that produces some physical examination signs similar to those associated with tension pneumothorax is cardiac tamponade. This condition, like tension pneumothorax, can cause severe, rapid circulatory failure and death. It commonly occurs as the result of a leakage of blood from an injury of the heart into the pericardium (a sac surrounding the heart), causing a buildup of pressure on the cardiac chambers. This pressure prevents the heart from filling and causes a backup of blood in the great veins. This is associated with distention of the neck veins. Because the heart cannot fill, it is not able to pump normally. Again, the heart rate speeds up in a compensatory effort. However, cardiac output and blood pressure fall and cardiac arrest ultimately results.

Tension pneumothorax and cardiac tamponade can both occur in similar settings and, because they require different treatments, their disambiguation is of great importance. The treatment for tension pneumothorax is to insert a large needle or tube between the ribs into the chest cavity to provide an exit for the pressurized air. This decompresses the lungs and relieves pressure on the major mediastinal veins, and restores the cardiac output.

Cardiac tamponade, on the other hand, requires the decompression of the pericardium by inserting a needle under the sternum (breastbone) and into the pericardium to draw off blood that is exerting pressure on the heart. This decompression must be performed in such a way as not to further injure the heart. If the decompressing needle actually contacts the surface of the heart, the electrocardiogram attached to the needle displays a so-called "injury current". As an alternative to needle decompression, the pericardium sometimes must be surgically opened through an incision in the chest or in the upper abdomen to permit decompression of the pericardium through the diaphragm.

Diagnosis of both tension pneumothorax and cardiac tamponade is based principally on a clinical examination of the patient, and particularly examination of the patient's neck and chest by the health care practitioner using his/her eyes, ears and hands. The findings on physical examination are particularly important when the condition has occurred in a casualty outside a hospital setting. Within the hospital setting, electronic monitors, displaying the patient's heart rate, blood pressure, central venous pressure, cardiac output, airway pressure, blood oxygen saturation and similar physiologic parameters are employed to monitor the clinical course of severely ill patients. Deterioration in the cardiovascular or respiratory status of the patient may be reflected by such monitoring. Since the deterioration may be caused by tension pneumothorax or cardiac tamponade, or by something else, a physical examination of the patient, occasionally combined with ultrasound studies, is carried out to secure a correct diagnosis. Treatment must urgently follow diagnosis. Recovery of the patient following correct treatment of the underlying cause of the cardiovascular/respiratory derangement is reflected not only by a reversal of the abnormal findings on physical examination of the neck and chest but also by the normalizing trend of the monitored physiologic parameters.

Suspicion of tension pneumothorax or cardiac tamponade in conscious patients is often raised by patient complaints of difficulty in breathing. The diagnosis is more difficult in unconscious patients or those who have tracheal tubes and who are receiving assisted ventilation. In these cases, a fall in blood pressure and increased heart rate trigger a focused examination of the patient to look for signs of tension pneumothorax or cardiac tamponade. The diagnosis of either of these conditions and the differentiation between the two involve the detection of distinctly abnormal findings upon physical examination of the patient's neck and chest. For example, in both conditions characteristic abnormalities include: visible distention (bulging) of the veins on both sides of the neck and rapid weak pulses palpated by the fingertips of the examiner in the patient's wrist or neck arteries. The presence of other conditions that may be associated with tension pneumothorax or cardiac tamponade, such as hemorrhagic shock, may confound the diagnostic features, for example by minimizing neck vein distention.

In the case of tension pneumothorax, in addition to the changes in the neck veins and pulses, the trachea is deviated, that is displaced, away from its normal midline position in the front of the neck. This abnormality is detectable on physical examination of the neck by palpation of the trachea in the notch at the top of the sternum (breastbone) between the heads of the clavicles (collarbones). This finding is not present in cardiac tamponade. Thus, the position of the trachea in the neck is not only an important factor in making the diagnosis of tension pneumothorax, it is also a major factor in the differential diagnosis between tension pneumothorax and cardiac tamponade.

In the case of cardiac tamponade, the presence of blood within the pericardial sac typically causes the heart sounds to be "muffled", that is, more difficult to hear with a stethoscope.

Another physical examination finding that occurs in tension pneumothorax that is not present in tamponade, is asymmetry of the breath sounds that can be heard by an examiner listening with a stethoscope on the two sides of the chest. In tension pneumothorax, the breath sounds audible on physical examination are typically diminished or absent on the side where the abnormal pressure build-up has compressed the lung. The absence of breath sounds on one side of the chest together with the deviation of the trachea away from that side of the chest permit the accurate localization of the side of the tension pneumothorax.

Together with the findings of low blood pressure, a rapid weak pulse, bulging of the neck veins and deviation of the trachea, this asymmetry of the breath sounds confirms the diagnosis of tension pneumothorax and makes a disambiguation from pericardial tamponade possible. As has been indicated above, this distinction is critical because the treatment of the two life-threatening conditions is quite different.

Because these conditions are necessarily diagnosed by clinical, physical examination, there is a critical need for a manikin that allows the trainee to learn and practice the rapid physical diagnosis and the correct treatment of tension pneumothorax and cardiac tamponade and to reassess the simulated patient for the reversal of the abnormalities caused by these conditions immediately after treatment.

Since both conditions can cause rapid patient death, expertise in their differential diagnosis and treatment should be assured in practitioners certified in any form of advanced life support. Thus, it is desirable to integrate sensors into the manikin that provide objective data to permit assessment of trainee performance. Sensors that permit assessment of the timeliness and correctness of diagnosis and treatment would be particularly desirable.

Because of the above considerations, there is a critical need for improved systems for simulating the diagnostic features of tension pneumothorax and cardiac tamponade within medical training manikins.

SUMMARY OF INVENTION

In one embodiment, a system is configured to selectively and reversibly simulate diagnostic features of tension pneumothorax and cardiac tamponade. The system is configured to simulate deviation of the trachea. The system is configured to simulate jugular vein distension.

In one aspect, the system is further configured to simulate alteration of breath sounds.

In one aspect, the system is further configured to simulate alteration of heart sounds.

In one aspect, the system is further configured to simulate increased pulse rate.

In one aspect, the system is further configured to simulate decreased blood pressure.

In one aspect, the system further comprises an artificial chest including a first hollow compartment representing a first hemithorax, and a second hollow compartment representing a second hemithorax, the first and second hollow compartments being separated by a barrier.

In one aspect, the system further comprises an artificial chest including a first hollow compartment representing a first hemithorax, and a second hollow compartment representing a second hemithorax, the first and second hollow compartments being separated by a barrier. The barrier is a double walled airtight barrier.

In one aspect, the system further comprises an artificial chest including a first hollow compartment representing a first hemithorax, and a second hollow compartment representing a second hemithorax, the first and second hollow compartments being separated by a barrier, the barrier being moveable from side to side under the influence of a pressure differential between the first hollow compartment and the second hollow compartment.

In one aspect, the system further comprises an artificial chest including a first hollow compartment representing a first hemithorax, and a second hollow compartment representing a second hemithorax, the first and second hollow compartments being separated by a barrier; and at least one pressurization device that is operatively connected to the first and second hollow compartments such that the first hollow compartment, the second hollow compartment, or both the first and second hollow compartments are pressurizable by infusion of a fluid via the at least one pressurization device.

In one aspect, the system further comprises an artificial chest including a first hollow compartment representing a first hemithorax, and a second hollow compartment representing a second hemithorax, the first and second hollow compartments being separated by a barrier; and at least one pressurization device that is operatively connected to the first and second hollow compartments such that the first hollow compartment, the second hollow compartment, or both the first and second hollow compartments are pressurizable by infusion of a fluid via the at least one pressurization device. A flow of the fluid to the first and second hollow compartments is controllable via at least one valve.

In one aspect, the system further comprises an artificial chest including a first hollow compartment representing a first hemithorax, and a second hollow compartment representing a second hemithorax, the first and second hollow compartments being separated by a barrier; and at least one hand pump that is operatively connected to the first and second hollow compartments such that the first hollow compartment, the second hollow compartment, or both the first and second hollow compartments are pressurizable by infusion of a fluid via the at least one hand pump.

In one aspect, the system further comprises an artificial trachea configured to shift laterally in a manner that is detectable by touch from a location outside the artificial chest, thereby simulating deviation of the trachea.

In one aspect, the system further comprises an artificial chest including a first hollow compartment representing a first hemithorax, and a second hollow compartment representing a second hemithorax, the first and second hollow compartments being separated by a barrier, the barrier being moveable from side to side under the influence of a pressure differential between the first hollow compartment and the second hollow compartment, and an artificial trachea is affixed to the barrier, the artificial trachea being configured to shift away from whichever of the first and second hollow compartments has a higher pressure.

In one aspect, the system further comprises an artificial neck that includes at least one channel representing a jugular vein, the at least one channel being selectively actuated so as to bulge and thereby simulate jugular vein distension.

In one aspect, the system further comprises an artificial chest including a first hollow compartment representing a first hemithorax, and a second hollow compartment representing a second hemithorax, the first and second hollow compartments being separated by a barrier that includes at least two layers, a pressurization device that is operatively connected to the first and second hollow compartments such that the first hollow compartment, the second hollow compartment, or both the first and second hollow compartments are pressurizable by infusion of a fluid via the pressurization device; a bladder disposed between the two layers of the barrier, the bladder containing a fluid; at least one channel connected to the bladder and extending into an artificial neck. The bladder is compressible via pressure exerted on the bladder by at least one of the first and second hollow compartments such that the fluid flows into the at least one channel, thereby simulating jugular vein distension.

In one aspect, the system further comprises an artificial chest including a first hollow compartment representing a first hemithorax, and a second hollow compartment representing a second hemithorax, the first and second hollow compartments being separated by a barrier; at least one sensor configured to detect a pressure within each of the first and second hollow compartments; and at least one logic controller configured to receive data from the at least one sensor.

In one aspect, the system further comprises an artificial neck that includes at least one channel representing a jugular vein, the at least one channel being selectively actuated so as to bulge and thereby simulate jugular vein distension; at least one sensor configured to detect a pressure within each of the first and second hollow compartments; and a logic controller configured to receive data from the at least one sensor. The logic controller is configured to control bulging of the at least one channel based on the data received from the at least one sensor.

In one aspect, the system further comprises an artificial chest having a first side and a second side; and a breath sound mechanism configured to create breath sounds. The breath sound mechanism is configured such that breath sounds can selectively be lowered or switched off on one side of the artificial chest, while breath sounds remain on the other side of the chest.

In one aspect, the system further comprises an artificial chest including a first hollow compartment representing a first hemithorax, and a second hollow compartment representing a second hemithorax, the first and second hollow compartments being separated by a barrier; at least one sensor configured to detect a pressure within each of the first and second hollow compartments; a logic controller configured to receive data from the at least one sensor; and a breath sound mechanism configured to create breath sounds that are audible with a standard medical stethoscope. The logic controller is configured to control the breath sound mechanism such that, when pressure in one of the hollow compartments increases above a predetermined threshold value, breath sounds are lowered or switched off on a corresponding side of the artificial chest while breath sounds remain on the other side of the artificial chest.

In one aspect, the logic controller is configured to control the breath sound mechanism such that, when pressure in said one of the hollow compartments returns to a normal level, breath sounds are switched on again on said corresponding side of the artificial chest.

In one aspect, the system further comprises an artificial chest including a first hollow compartment representing a first hemithorax, a second hollow compartment representing a second hemithorax, and a third hollow compartment representing a pericardium; a pressurization device that is operatively connected to the third hollow compartments such that the third hollow compartment is pressurizable by infusion of a fluid via the pressurization device; a bladder located in the third hollow compartment, the bladder containing a fluid; and at least one channel connected to the bladder and extending into an artificial neck. The bladder is compressible via pressure exerted on the bladder by increased pressure in the third hollow compartment such that the fluid flows into the at least one channel, thereby simulating jugular vein distension. The third hollow compartment is separated from the first hollow compartment by a non-stretching, airtight barrier such that pressure in the third compartment is not influenced by pressure changes in the first and second hollow compartments.

In one aspect, the system further comprises an artificial chest including a first hollow compartment representing a first hemithorax, a second hollow compartment representing a second hemithorax, and a third hollow compartment representing a pericardium, the first and second hollow compartments being separated by a barrier that includes at least two layers; a first pressurization device that is operatively connected to the first and second hollow compartments such that the first hollow compartment, the second hollow compartment, or both the first and second hollow compartments are pressurizable by infusion of a fluid via the first pressurization device; a second pressurization device that is operatively connected to the third hollow compartments such that the third hollow compartment is pressurizable by infusion of a fluid via the second pressurization device; a first bladder disposed between the two layers of the barrier, the bladder containing a fluid; a second bladder located in the third hollow compartment; and at least one channel having a first lumen connected to the first bladder and a second lumen connected to the second bladder, the at least one channel extending into an artificial neck. The first bladder is compressible via pressure exerted on the first bladder by at least one of the first and second hollow compartments such that the fluid flows into the first lumen of the at least one channel, thereby simulating jugular vein distension. The second bladder is compressible via pressure exerted on the second bladder by increased pressure in the third hollow compartment such that the fluid flows into the second lumen of the at least one channel, thereby simulating jugular vein distension. The third hollow compartment is separated from the first hollow compartment by a non-stretching, airtight barrier such that pressure in the third compartment is not influenced by pressure changes in the first and second hollow compartments.

In one aspect, the system further comprises an artificial neck; a fluid pumping system configured to pump fluid through an artificial circulation system within the artificial neck; and a logic controller configured to control at least one of a rate and a stroke volume of the fluid pumping system.

In one aspect, the system further comprises an artificial chest including at least one hollow compartment. The logic controller is configured to increase the at least one of the rate and the stroke volume when pressure in the at least one hollow compartment increases to a predetermined value.

In one aspect, the system further comprises the logic controller is configured to decrease the at least one of the rate and the stroke volume when pressure in the at least one hollow compartment returns to a predetermined normal value.

In one aspect, the system further comprises an artificial chest including a first hollow compartment representing a first hemithorax, a second hollow compartment representing a second hemithorax, and a third hollow compartment representing a pericardium; and a simulated heart located in the third hollow compartment, the simulated heart being configured to simulate contractions.

In one aspect, the system further comprises an artificial chest including a first hollow compartment representing a first hemithorax, a second hollow compartment representing a second hemithorax, and a third hollow compartment representing a pericardium; and at least one optical or magnetic sensor configured to sense a location of needle or knife inserted into the artificial chest for decompression of one of the hollow compartments.

In one aspect, the system further comprises an artificial chest including at least one hollow compartment; at least one sensor configured to detect a pressure in the at least one hollow compartment; a logic controller configured to receive data from the at least one sensor; and a heart sound mechanism configured to create heart sounds. The logic controller is configured to alter the heart sounds when pressure in the at least one hollow compartment increases to a predetermined value.

In one aspect, the system further comprises an artificial chest including at least one hollow compartment; at least one sensor configured to detect a pressure in the at least one hollow compartment; a logic controller configured to receive data from the at least one sensor; and an audio mechanism configured to play an audio recording of an individual complaining of difficulty breathing, when pressure in the at least one hollow compartment increases to a predetermined value.

In one aspect, the system further comprises an artificial chest including at least one hollow compartment; at least one sensor configured to detect a pressure in the at least one hollow compartment; and a logic controller configured to receive data from the at least one sensor. The logic controller is configured to be connected to a physiologic monitor, and control a display of at least one of heart rate, blood pressure, stroke volume, central venous pressure, cardiac output, peak airway pressure, mixed-venous oxygen saturation and arterial oxygen saturation, based on the data received from the at least one sensor.

In one aspect, the logic controller is configured to control the display such that the at least one of the heart rate, blood pressure, stroke volume, central venous pressure, cardiac output, peak airway pressure, mixed-venous oxygen saturation and arterial oxygen saturation is shown to be abnormal when pressure in the at least one hollow compartment increases to a predetermined value.

In one aspect, the logic controller is configured to control the display such that the at least one of the heart rate, blood pressure, stroke volume, central venous pressure, cardiac output, peak airway pressure, mixed-venous oxygen saturation and arterial oxygen saturation is shown to be normal when pressure in the at least one hollow compartment returns to a predetermined normal value.

In one aspect, the system further comprises an artificial chest including a first hollow compartment representing a first hemithorax, a second hollow compartment representing a second hemithorax, and a third hollow compartment representing a pericardium; and a simulated heart located in the third hollow compartment. Contact of a needle or knife with the simulated heart causes a low-voltage electrical circuit to be completed.

In one aspect, the system further comprises an artificial chest including a first hollow compartment representing a first hemithorax, a second hollow compartment representing a second hemithorax, and a third hollow compartment representing a pericardium; at least one sensor configured to detect a pressure in the at least one hollow compartment; a logic controller configured to receive data from the at least one sensor; and a heart sound mechanism configured to create heart sounds. The logic controller is configured to lower a volume of the heart sounds when pressure in the third hollow compartment increases to a predetermined value.

BRIEF DESCRIPTION OF THE DRAWINGS

The accompanying drawings, which are incorporated in and constitute a part of this specification, illustrate embodiments of the invention and together with the description serve to explain principles of the invention.

DETAILED DESCRIPTION OF THE PREFERRED EMBODIMENTS

Embodiments of the present invention include systems for simulating the diagnostic features of tension pneumothorax and cardiac tamponade, and more particularly, systems for simulating the diagnostic features of tension pneumothorax and cardiac tamponade within a medical training manikin.

There are a variety of manikins can electronically manifest the physiologic changes associated with various abnormal respiratory and cardiac conditions by changing the displays on electronic monitors. There are also manikins currently on the market for practicing needle insertion into the chest and pericardium. There is, to our knowledge, no manikin in the prior art which (i) automatically manifests the physical diagnostic signs of tension pneumothorax or cardiac tamponade when there is a buildup of pressure inside the compartments of the chest, or (ii) is configured to present or display the different physical signs and monitored physiologic parameters which disambiguate these two life endangering conditions, or (iii) is configured to automatically reverse these physical signs after proper decompression of the increased pressure in the chest. Embodiments of the present invention can provide any or all of these features.

In embodiments of the present invention, systems are provided that automatically detect changes in the simulated pleural or pericardial pressure and transmit data regarding such changes to a logic circuit, automatically trigger a response that changes the physical examination characteristics in the manikin, and automatically change a display of abnormal physical signs involving the 1.) neck veins, 2.) the position of the trachea, 3.) the presence or absence of breath sounds, 4.) the loudness of the auscultated heart sounds and/or 5.) a change in blood pressure or pulse characteristics following pressurization of one or more compartments of the chest and/or following the correct treatment of tension pneumothorax or cardiac tamponade.

In a further embodiment, the output from the pressure sensors located within the compartments of the chest pass to a logic circuit which controls the displayed parameters on simulated electronic monitors of cardiovascular and respiratory parameters, such as blood pressure, central venous pressure, cardiac output, peak airway pressure, arterial oxygen saturation, mixed venous oxygen saturation and the like. Elevation of pressure in one or more compartments of the chest triggers the logic circuit to cause programmed abnormalities of the cardiovascular and respiratory function to be displayed on the electronic monitors. As in the case of the physical diagnostic features, the abnormalities displayed on the monitors are automatically reversed when proper treatment of the tension pneumothorax or cardiac tamponade is accomplished.

In embodiments of the present invention, a system is provided that is configured to (i) support training medical care providers in crucial elements of the physical examination and/or electronic cardiorespiratory monitoring diagnosis of tension pneumothorax and pericardial tamponade, (ii) immediately and automatically change the physical signs and electronic monitor displays to reflect the results of successful treatment, (iii) record the performance of the trainee with respect to the essential steps of physical examination, (iv) detect and record evidence of correct diagnosis and correct treatment modality, and (v) detect and record evidence that the trainee has examined the simulated patient after treatment.

Figure 1:
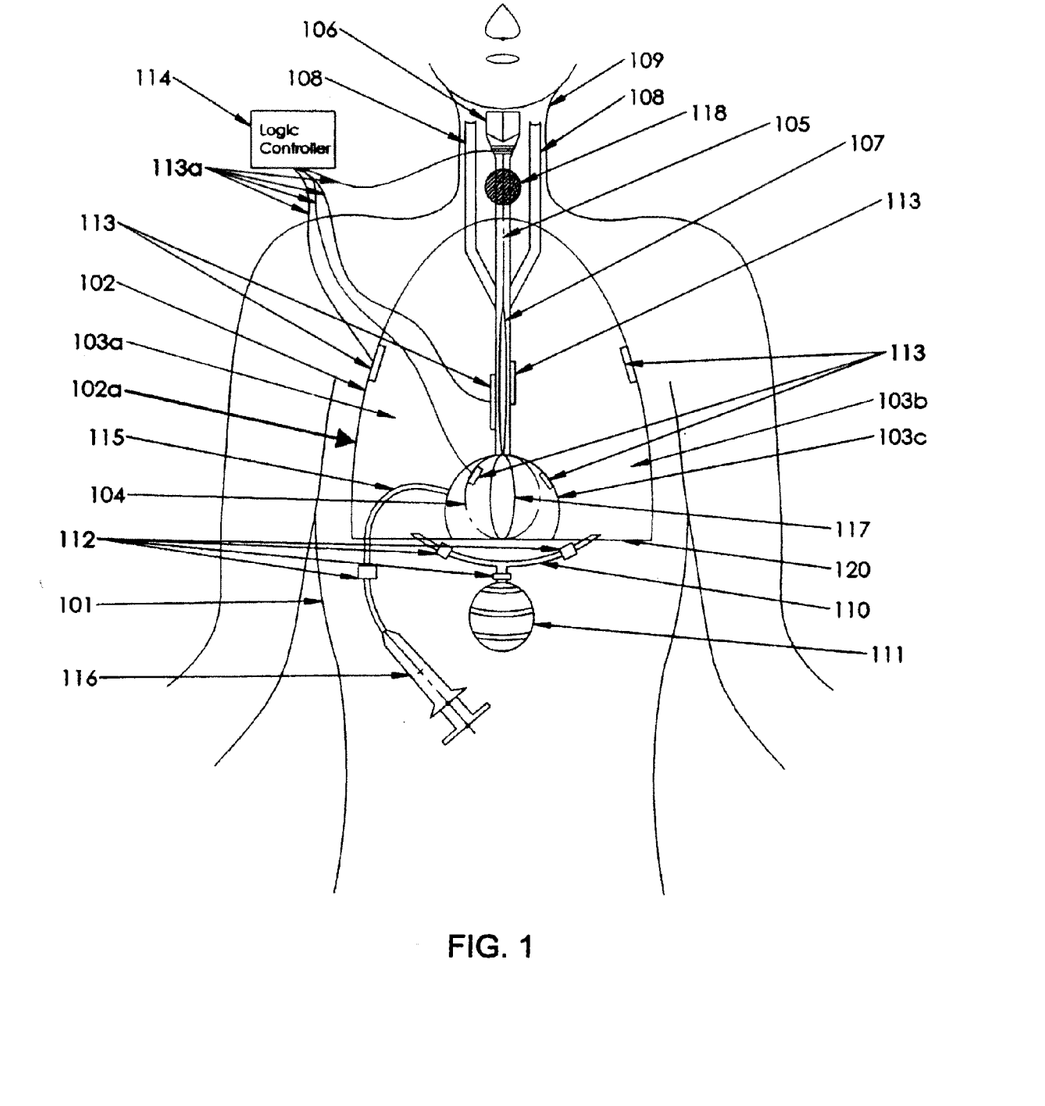
FIG. 1 is a front cutaway view of a manikin that includes a system for simulating the diagnostic features of tension pneumothorax and cardiac tamponade according to one embodiment.

FIG. 1 is a front cutaway view of a manikin that includes a system 100 for simulating the diagnostic features of tension pneumothorax and cardiac tamponade according to one embodiment. The system 100 may be integrated into an artificial torso 101, which can itself be integrated into a full-size manikin of any simulated age and either gender. The artificial torso 101 includes an artificial chest 102 with chest walls 102a, and an artificial neck 109. The artificial chest 102 may include artificial skin, subcutaneous tissue, muscles, ribs, and clavicles, and an artificial sternum. The artificial chest 102 may also include shoulder girdles and upper extremity structures. The thickness of the soft tissues representing subcutaneous fat of the chest wall 102a may vary. The artificial sternum may include a ridge representing the angle of Louis (the anterior angle formed by the junction of the manubrium and the body of the sternum) at the level of the second intercostal space. The layers of soft tissues of the chest wall 102a are preferably made of a material that can be penetrated with a needle or knife, and preferably an elastomeric material that can be penetrated with a needle or knife. Examples of such materials include silicone or polyurethane elastomers or foams, or hydrogels such as polyvinyl alcohol hydrogels.

The artificial chest 102 includes, in its interior, at least two hollow compartments, a first hollow compartment 103a, which represents a first hemithorax, and a second compartment 103b, which represents a second hemithorax. Representations of the lungs may be present in the first and second compartments 103a and 103b. The artificial chest 102 preferably further includes a third compartment 103c, representing the pericardium, as discussed in more detail below.

The first compartment 103a and the second compartment 103b are separated from each other by a barrier 105. The midline barrier 105 is preferably a double walled, airtight barrier. The barrier 105 may be a layered solid or membranous airtight barrier. The barrier 105 is flexible at various points so that it is movable from side to side under the influence of a pressure differential between the first compartment 103a and the second compartment 103b.

The pressure within the first and second compartments 103a and 103b can be individually raised above atmospheric pressure by the pump-driven infusion of a fluid, such as air or water, through pressurization tubes 110, and into the compartments 103a and 103b. A pressurization device, such as a hand pump 111, may be connected to the first and second compartments 103a and 103b via the pressurization tubes 110. The pressurization device 111 is configured to elevate the pressure of one or both of the first and second compartments 103a and 103b. The flow of fluid in the tubes 110 can be controlled using valves 112.

Because the first and second compartments 103a and 103b can be pressurized with fluid, the insertion of a decompressing, hollow needle or a knife into the compartment results in a jet of pressurized air that is potentially audible by a trainee. In another embodiment, the audible whoosh of air can be simulated by a sound mechanism 201 concealed within the pleural cavity of the manikin (schematically shown in FIG. 2). The sound mechanism 201 includes one or more speakers. The reduction in pleural pressure caused by successful needle insertion into the affected chest compartment causes a programmed logic controller to play a sound simulating the audible whoosh through one or more of the speakers.

Figure 2:
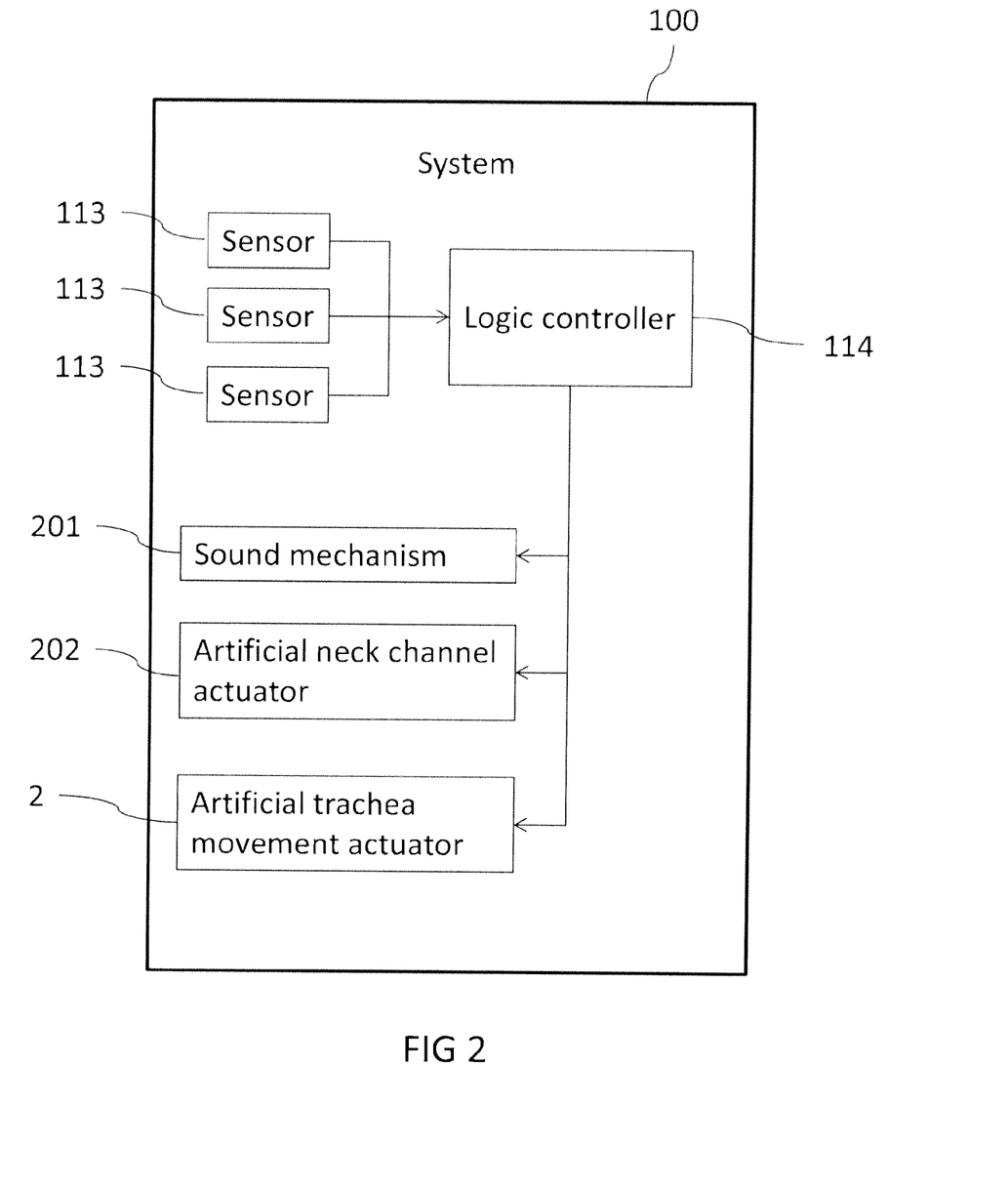
FIG. 2 is a schematic view of an embodiment that includes sensors connected to a logic controller.

An artificial trachea 106 extends upward from the barrier 105. Movement of the barrier 105 between the two lateral halves of the artificial chest 102, resulting from a differential pressure between the first compartment 103a and the second compartment 103b, causes the artificial trachea 106 that is affixed to the upper end of the barrier 105 to shift laterally within the artificial soft tissues of the neck at the level of the sternal notch. The artificial trachea 106 shifts away from the compartment that has the higher pressure. The trachea can be affixed to the midline barrier using, for example, mechanical fasteners such as screws, or using adhesives, such as epoxy formulations. In an alternative embodiment, the position of the trachea is shifted through the action of a small electronic actuator 203 controlled by the programmed logic circuit.

As discussed above, the barrier 105 preferably includes at least two layers. At least one bladder 107 is disposed between the two layers. The bladder 107 contains a fluid, preferably a liquid such as water. Pressure on the bladder 107 created by pressure in the first or second compartment 103a or 103b will compress the bladder 107. The bladder 107 is connected in a fluid-conducting manner to one or more channels or tubes 108 which extend upward into the artificial neck 109. The system 100 preferably includes two of the tubes 108, representing external jugular veins. The tubes 108 may be located on the left and right sides of the artificial neck 109, within artificial skin of the artificial neck. The tubes 108 may be soft, such that the tubes 108 are expandable in a radial direction. Alternatively, channels may be molded into the artificial tissues of the neck to conduct the hydraulic fluid. When the fluid in the bladder 107 is pressurized by pressure on the bladder 107, the fluid is displaced and enters the tubes or channels of the neck 108. The pressurized fluid from the bladder 107 enters the tubes 108 and causes the tubes 108 to bulge along the simulated course of the external jugular veins. The tubes 108 are unexpanded (and may be, for example, flat) in the absence of an elevation above atmospheric pressure within the first and second compartments 103a and 103b.

The system 100 preferably includes one or more pressure sensors 113. At least one of the pressure sensors 113 may be configured to detect the pressure within each of the first and second compartments 103a and 103b. For example, the system 100 may include one pressure sensor 113 for each compartment 103a and 103b, as shown in FIG. 1. Any or all of the pressure sensors 113 may be operatively connected to one or more logic controllers 114, for example via wires 113a, so that data from the sensor is received at the logic controller 114. In an alternative embodiment, wireless transmission from the sensors may be employed. The pressure sensors 113 may be, for example, Flexiforce® sensors, available from Tekscan, Inc.

Although, in the preferred embodiment, the direct action of the air pressure within the first and second compartments 103a and 103b causes the artificial trachea 106 to shift and the tubes 108 to fill, in other embodiments, one or more actuators or motors electronically linked to the pressure sensors 113 within the artificial chest 102 may be used to cause the artificial trachea 106 to shift and the artificial neck veins to bulge (e.g., artificial neck channel actuator 202 and artificial trachea actuator 203, schematically shown in FIG. 2).

The system 100 may include a mechanism for creating breath sounds and heart sounds that are audible with a standard medical stethoscope in the two sides of the artificial chest 102. These breath sounds and heart sounds may be produced by a digital recorder with a speaker. Breath sounds may alternatively be produced by the pneumatic impulse from an air pump. These breath sounds and heart sounds are controlled by the programmed logic circuit and are automatically altered by the pressurization/depressurization of one or more compartments of the chest. The logic controller 114 may be configured to automatically switch off the breath sounds on one side of the artificial chest 102 when that side of the chest is pressurized without altering the breath sounds in the other side of the artificial chest 102. For example, the logic controller 114 may include a switch that is activated by an increase in pressure within one of the compartments 103a and 103b. In the preferred embodiment, the output of pressure sensors 113 received by the logic controller 114 may control the breath sounds mechanism. Specifically, the logic controller 114 may switch off the breath sounds automatically when the pressure in one of the compartments 103a and 103b, detected by the pressure sensors 113, is increased to a predetermined threshold value by an infusion of air. Conversely, when the pressure within a compartment 103a or 103b returns to a predetermined "normal" level, the logic controller 114 can automatically activate the breath sounds mechanism in that compartment 103a or 103b.

In the case of cardiac tamponade, the presence of blood within the pericardial sac typically causes the heart sounds to be "muffled", that is, more difficult to hear with a stethoscope. In one embodiment, the system includes a logic controller configured to modulate the volume of the heart sounds so as to simulate the muffling of heart sounds caused by cardiac tamponade.

The third compartment 103c represents the pericardium. A representation of the heart, such as artificial heart 104, may be present in the third compartment 103c. The artificial heart is preferably made of elastomeric materials such as silicone. The artificial heart may have simulated contractions caused by actuators or by pneumatic or hydraulic pumping systems. The wall of the artificial heart may contain magnetic elements or electrically conductive materials. The third compartment may be isolated from the first and second compartments 103a and 103b. The third compartment 103c preferably includes a non-stretching, airtight membrane or wall in the areas where the third compartment 103c abuts the first and second compartments 103a and 103b, such that pressure within the third compartment 103c is not influenced by pressure elevations or differentials in the first and second compartments 103a and 103b. The third compartment, containing the heart, while essentially non-compressible, may be displaced laterally as the result pressure elevations in compartments 103 a or 103b. Similarly, pressure increases in the third compartment 103c preferably do not influence the pressure in the first and/or second compartments 103a and 103b.

The floor of the third compartment 103c preferably includes an artificial diaphragm 120 attached circumferentially around the inner aspects of the entire artificial chest 102. The attachment devices used to attach the artificial diaphragm 120 to the chest wall 102a may be mechanical devices such as screws or rivets, which may be combined with strong adhesives and/or sealants, so that the three compartments of the chest are airtight. The artificial diaphragm is preferably made of a waterproof, semi-rigid fabric that is penetrable by a needle or a surgical knife. Thus, the third compartment 103c is configured such that a hollow needle is insertable into the third compartment 103c, via the abdominal wall, through the artificial diaphragm, to drain fluid from the third compartment 103c and thereby decrease the pressure in the third compartment 103c. Materials suitable for the artificial diaphragm 120 include silicone or polyurethane or other elastomers or foams laminated with fabrics such as nylon, Dacron, cotton or silk fabric or mesh. Alternatively, hydrogel materials may be used alone or in association with woven or nonwoven fabrics made of cotton, cellulose, silk, nylon or the like to simulate the diaphragm.

The third compartment 103c preferably contains small amount of fluid, such as air or water, at atmospheric pressure. In one embodiment, the fluid is provided by a lubricating system with tubing from a concealed reservoir leading to small apertures in the third compartment 103c. Lubricants may include aqueous suspensions of glycerin, methylcellulose and hydroxymethulcellulose. The pressure within the third compartment 103c can be raised above atmospheric pressure by the pump-driven infusion of a fluid, such as air, water, or artificial blood, through pressurization tubes 115, and into the third compartment 103c. A pressurization device, such as a syringe 116, may be connected to the first and third compartment 103c via the pressurization tubes 115. The pressurization device 111 is configured to pressurize the third compartment 103c. The flow of fluid in the tube 115 can be controlled using a valve 112.

One of the pressure sensors 113 may be configured to detect the pressure within the third compartment 103c.

The third compartment includes a bladder 117, which contains a fluid, preferably a liquid such as water. Pressure on the bladder 117 created by increased pressure in the third compartment 103c will compress the bladder 117. The bladder 117 is connected in a fluid-conducting manner to one or more channels or tubes that extend upward into the artificial neck 109. In a preferred embodiment, these channels or tubes are the tubes 108. When the bladder 117 is compressed, the fluid in the bladder 117 is displaced and enters the tubes 108. The pressurized fluid from the bladder 107 enters the tubes 108 and causes the tubes 108 to bulge along the simulated course of the external jugular veins. It is preferable that the tubes 108 have a double lumen created by a septum disposed in the tubes 108. Tubing from the bladder 107 in the barrier 105 between the first and second compartments 103a and 103b leads to one lumen of the tubes 108. Tubing from the bladder 117 in the third compartment 103c leads to the other lumen. Thus, the tubes 108 may be configured to distend as a result of an elevation of pressure in any of the three compartments 103a, 103b, and 103c. However, the tubes 108 are configured to distend in response to increased pressure in the third compartment 103c, without an elevation in pressure in the first compartment 103a or second compartment 103b, and without deviation of the artificial trachea 106.

In other embodiments, two sets of tubes may be used in one or both sides of the artificial neck, rather than a single double lumen tube.

The system 100 can further include a fluid pumping system, configured to pump fluid through an artificial circulation system within the artificial neck and/or the artificial extremities. The fluid pumping system may be an electric fluid pumping system. The artificial circulation system may include, for example, tubes representing artificial arteries that follow the approximate anatomic course of the carotid arteries in the neck, the brachial arteries in the arm and forearm, and/or the radial arteries in the arm and forearm. In another embodiment, in which the simulator is a full bodied manikin, lower extremity vessels including the femoral arteries may be included in the simulated circulatory system.

The logic controller 114 may be configured to control the rate and stroke volume of the fluid pumping system. The logic circuit 114 may, for example, process data from the pressure sensors 113 and control the fluid pumping system based on this data. For example, if the logic controller 114 received data regarding elevation of pressure in any or all of the first, second, and third compartments 103a, 103b, and 103c, the logic circuit may then cause the pump to alter its rate and stroke volume so as to simulate increased heart rate and/or decreased blood pressure. Similarly, when the pressure in the compartments 103a, 103b, and 103c returns to a predetermined normal pressure, the rate and stroke volume may be adjusted accordingly. The change in rate and stroke volume is preferably palpable in the artificial arteries of the system 100. The change in rate and stroke volume is preferably detectable using a standard sphygmomanometer and stethoscope. In an alternative embodiment, changes in the circulatory pressure can be displayed on electronic monitors receiving display instructions from the programmed logic controller.

The system 100 may include an additional pressure sensor 118 located on or near the artificial trachea 106. This pressure sensor 118 may be configured to detect the pressure exerted on the artificial trachea 106 by a user's fingers when a user palpates the neck to determine the position of the artificial trachea 106. Additional sensors may be included that are configured to detect palpation of the artificial veins (such as tubes 108) and/or artificial arteries by a user.

The pressure data received by the logic controller 114 from the pressure sensors 113 and 118 may be time stamped and recorded in digital memory. The logic controller 114 may be configured to determine whether a user has correctly performed a treatment of a simulated tension pneumothorax or cardiac tamponade based on the pressure data received from each of the pressure sensors 113.

In an alternative embodiment, optical or magnetic sensors may be included at various locations within the chest wall or pleural space to determine the location of a penetrating needle inserted for decompression of one of the chest compartments. Using the output from the combination of sensors, the logic controller may, for example, be able to determine the time between (i) an increase in pressure in any of the compartments 103a, 103b, and 103c, (ii) the insertion of a needle into the chest compartments and iii, a decrease in pressure caused by a treatment of the simulated condition as accomplished, for example, by the insertion of a hollow needle.

The logic controller 114 may be further configured to detect whether a user rechecks the position of the artificial trachea 106 based on data received from the pressure sensor 118.

The logic controller 114 may be further configured to encrypt, date, and transmit data, via a wired device or wireless device including radio frequency transmission means, to a monitor, display, or computer at a remote location. This embodiment will permit the analysis of data and evaluation of trainee performance by an observer who is not physically present.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The communication networks can include, for example, packet-based networks and/or circuit-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., Wi-Fi network, RAN, Bluetooth, code-division multiple access (CDMA) network, time division multiple access (TDMA) network, global system for mobile communications (GSM) network), and/or other circuit-based networks.

The client device can include, for example, a computer, a computer with a browser device, a telephone, an IP phone, a mobile device (e.g., cellular phone, personal digital assistant (PDA) device, laptop computer, electronic mail device, and/or the like), and/or other communication devices. The browser device includes, for example, a computer (e.g., desktop computer, laptop computer, mobile device or the like) with a world wide web browser (e.g., Microsoft® Internet Explorer® available from Microsoft Corporation, Mozilla® Firefox available from Mozilla Corporation, and/or the like). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

As used in this application, the terms "component," "module," "system," and the like can refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a computer-readable medium. Computer-readable media is non-transitory in nature and includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any physical connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Other embodiments of the invention will be apparent to those skilled in the art from consideration of the specification and practice of the invention disclosed herein. It is intended that the specification and examples be considered as exemplary only.

What is claimed is:

1. A system comprising:
   an artificial chest including a first hollow compartment representing a first hemithorax, and a second hollow compartment representing a second hemithorax, the first and second hollow compartments being separated by a barrier, the barrier being moveable from side to side under the influence of a pressure differential between the first hollow compartment and the second hollow compartment; and
   an artificial trachea affixed to the barrier, the artificial trachea being configured to shift away from whichever of the first and second hollow compartments has a higher pressure in a manner that is detectable by touch from a location outside the artificial chest, thereby simulating deviation of the trachea.

2. The system of claim 1, wherein the system is further configured to simulate alteration of breath sounds.

3. The system of claim 1, wherein the system is further configured to simulate alteration of heart sounds.

4. The system of claim 1, wherein the system is further configured to simulate increased pulse rate.

5. The system of claim 1, wherein the system is further configured to simulate decreased blood pressure.

6. The system of claim 1,
   wherein the barrier is a double walled airtight barrier.

7. The system of claim 1, further comprising:
   at least one pressurization device that is operatively connected to the first and second hollow compartments such that the first hollow compartment, the second hollow compartment, or both the first and second hollow compartments are pressurizable by infusion of a fluid via the at least one pressurization device.

8. The system of claim 7, further comprising:
   wherein a flow of the fluid to the first and second hollow compartments is controllable via at least one valve.

9. The system of claim 1, further comprising:
   at least one hand pump that is operatively connected to the first and second hollow compartments such that the first hollow compartment, the second hollow compartment, or both the first and second hollow compartments are pressurizable by infusion of a fluid via the at least one hand pump.

10. The system of claim 1, further comprising:
    a breath sound mechanism configured to create breath sounds,
    wherein the breath sound mechanism is configured such that breath sounds can selectively be lowered or switched off on one side of the artificial chest, while breath sounds remain on the other side of the chest.

11. The system of claim 1, further comprising:
    at least one sensor configured to detect a pressure within each of the first and second hollow compartments;
    a logic controller configured to receive data from the at least one sensor; and
    a breath sound mechanism configured to create breath sounds that are audible with a standard medical stethoscope,
    wherein the logic controller is configured to control the breath sound mechanism such that, when pressure in one of the hollow compartments increases above a predetermined threshold value, breath sounds are lowered or switched off on a corresponding side of the artificial chest while breath sounds remain on the other side of the artificial chest.

12. The system of claim 11, wherein the logic controller is configured to control the breath sound mechanism such that, when pressure in said one of the hollow compartments returns to a normal level, breath sounds are switched on again on said corresponding side of the artificial chest.

13. The system of claim 1, further comprising:
    a third hollow compartment representing a pericardium; and
    a simulated heart located in the third hollow compartment, the simulated heart being configured to simulate contractions.

14. The system of claim 1, further comprising:
    a third hollow compartment representing a pericardium; and
    at least one optical or magnetic sensor configured to sense a location of needle or knife inserted into the artificial chest for decompression of one of the hollow compartments.

15. The system of claim 14, wherein the logic controller is configured to control the display such that the at least one of the heart rate, blood pressure, stroke volume, central venous pressure, cardiac output, peak airway pressure, mixed-venous oxygen saturation and arterial oxygen saturation is shown to be abnormal when pressure in at least one of the hollow compartments increases to a predetermined value.

16. The system of claim 14, wherein the logic controller is configured to control the display such that the at least one of the heart rate, blood pressure, stroke volume, central venous pressure, cardiac output, peak airway pressure, mixed-venous oxygen saturation and arterial oxygen saturation is shown to be normal when pressure in at least one of the hollow compartments returns to a predetermined normal value.

17. The system, of claim 1, further comprising:
    at least one sensor configured to detect a pressure in at least one of the hollow compartments;
    a logic controller configured to receive data from the at least one sensor; and
    a heart sound mechanism configured to create heart sounds,
    wherein the logic controller is configured to alter the heart sounds when pressure in at least one of the hollow compartments increases to a predetermined value.

18. The system of claim 1, further comprising:
    at least one sensor configured to detect a pressure in at least one of the hollow compartments;
    a logic controller configured to receive data from the at least one sensor; and
    an audio mechanism configured to play an audio recording of an individual complaining of difficulty breathing, when pressure in at least one of the hollow compartments increases to a predetermined value.

19. The system of claim 1, further comprising:
    at least one sensor configured to detect a pressure in at least one of the hollow compartments; and
    a logic controller configured to receive data from the at least one sensor,
    wherein the logic controller is configured to be connected to a physiologic monitor, and control a display of at least one of heart rate, blood pressure, stroke volume, central venous pressure, cardiac output, peak airway pressure, mixed-venous oxygen saturation and arterial oxygen saturation, based on the data received from the at least one sensor.

20. The system of claim 1, further comprising:
    a third hollow compartment representing a pericardium; and a simulated heart located in the third hollow compartment, wherein contact of a needle or knife with the simulated heart causes a low-voltage electrical circuit to be completed.

21. The system, of claim 1, further comprising:

a third hollow compartment representing a pericardium;

at least one sensor configured to detect a pressure in the third hollow compartment;

a logic controller configured to receive data from the at least one sensor; and a heart sound mechanism configured to create heart sounds, wherein the logic controller is configured to lower a volume of the heart sounds when pressure in the third hollow compartment increases to a predetermined value.

22. The system of claim 1, wherein the system is further configured to simulate jugular vein distension.

23. The system of claim 22, further comprising:

an artificial neck that includes at least one channel representing a jugular vein, the at least one channel being selectively actuated so as to bulge and thereby simulate jugular vein distension.

24. The system of claim 22, further comprising:

an artificial chest including a first hollow compartment representing a first hemithorax, and a second hollow compartment representing a second hemithorax, the first and second hollow compartments being separated by a barrier that includes at least two layers;

a pressurization device that is operatively connected to the first and second hollow compartments such that the first hollow compartment, the second hollow compartment, or both the first and second hollow compartments are pressurizable by infusion of a fluid via the pressurization device;

a bladder disposed between the two layers of the barrier, the bladder containing a fluid; and at least one channel connected to the bladder and extending into an artificial neck, wherein the bladder is compressible via pressure exerted on the bladder by at least one of the first and second hollow compartments such that the fluid flows into the at least one channel, thereby simulating jugular vein distension.

25. The system of claim 1, further comprising:

at least one sensor configured to detect a pressure within each of the first and second hollow compartments; and at least one logic controller configured to receive data from the at least one sensor.

26. The system of claim 22, further comprising:

an artificial neck that includes at least one channel representing a jugular vein, the at least one channel being selectively actuated so as to bulge and thereby simulate jugular vein distension;

at least one sensor configured to detect a pressure within each of the first and second hollow compartments; and a logic controller configured to receive data from the at least one sensor, wherein the logic controller is configured to control bulging of the at least one channel based on the data received from the at least one sensor.

27. The system of claim 22, further comprising:

an artificial chest including a first hollow compartment representing a first hemithorax, a second hollow compartment representing a second hemithorax, and a third hollow compartment representing a pericardium;

a pressurization device that is operatively connected to the third hollow compartments such that the third hollow compartment is pressurizable by infusion of a fluid via the pressurization device;

a bladder located in the third hollow compartment, the bladder containing a fluid; and at least one channel connected to the bladder and extending into an artificial neck, wherein the bladder is compressible via pressure exerted on the bladder by increased pressure in the third hollow compartment such that the fluid flows into the at least one channel, thereby simulating jugular vein distension, and wherein the third hollow compartment is separated from the first hollow compartment by a non-stretching, airtight barrier such that pressure in the third compartment is not influenced by pressure changes in the first and second hollow compartments.

28. The system of claim 22, further comprising:

an artificial chest including a first hollow compartment representing a first hemithorax, a second hollow compartment representing a second hemithorax, and a third hollow compartment representing a pericardium, the first and second hollow compartments being separated by a barrier that includes at least two layers;

a first pressurization device that is operatively connected to the first and second hollow compartments such that the first hollow compartment, the second hollow compartment, or both the first and second hollow compartments are pressurizable by infusion of a fluid via the first pressurization device;

a second pressurization device that is operatively connected to the third hollow compartments such that the third hollow compartment is pressurizable by infusion of a fluid via the second pressurization device;

a first bladder disposed between the two layers of the barrier, the bladder containing a fluid;

a second bladder located in the third hollow compartment; and at least one channel having a first lumen connected to the first bladder and a second lumen connected to the second bladder, the at least one channel extending into an artificial neck, wherein the first bladder is compressible via pressure exerted on the first bladder by at least one of the first and second hollow compartments such that the fluid flows into the first lumen of the at least one channel, thereby simulating jugular vein distension, wherein the second bladder is compressible via pressure exerted on the second bladder by increased pressure in the third hollow compartment such that the fluid flows into the second lumen of the at least one channel, thereby simulating jugular vein distension, and wherein the third hollow compartment is separated from the first hollow compartment by a non-stretching, airtight barrier such that pressure in the third compartment is not influenced by pressure changes in the first and second hollow compartments.

29. The system of claim 28, wherein the logic controller is configured to increase the at least one of the rate and the stroke volume when pressure in at least one of the hollow compartments increases to a predetermined value.

30. The system of claim 1, further comprising:
an artificial neck;
a fluid pumping system configured to pump fluid through an artificial circulation system within the artificial neck; and
a logic controller configured to control at least one of a rate and a stroke volume of the fluid pumping system.

31. The system of claim 30, wherein the logic controller is configured to decrease the at least one of the rate and the stroke volume when pressure in at least one of the hollow compartments returns to a predetermined normal value.

32. A system comprising:
an artificial chest including a first hollow compartment representing a first hemithorax, and a second hollow compartment representing a second hemithorax, the first and second hollow compartments being separated by a barrier that includes at least two layers;
a pressurization device that is operatively connected to the first and second hollow compartments such that the first hollow compartment, the second hollow compartment, or both the first and second hollow compartments are pressurizable by infusion of a fluid via the pressurization device;
a bladder disposed between the two layers of the barrier, the bladder containing a fluid; and
at least one channel connected to the bladder and extending into an artificial neck,
wherein the bladder is compressible via pressure exerted on the bladder by at least one of the first and second hollow compartments such that the fluid flows into the at least one channel, thereby simulating jugular vein distension.

33. A system comprising:
an artificial chest including a first hollow compartment representing a first hemithorax, a second hollow compartment representing a second hemithorax, and a third hollow compartment representing a pericardium;
a pressurization device that is operatively connected to the third hollow compartments such that the third hollow compartment is pressurizable by infusion of a fluid via the pressurization device;
a bladder located in the third hollow compartment, the bladder containing a fluid; and
at least one channel connected to the bladder and extending into an artificial neck,
wherein the bladder is compressible via pressure exerted on the bladder by increased pressure in the third hollow compartment such that the fluid flows into the at least one channel, thereby simulating jugular vein distension, and
wherein the third hollow compartment is separated from the first hollow compartment by a non-stretching, air-tight barrier such that pressure in the third compartment is not influenced by pressure changes in the first and second hollow compartments.

34. A system comprising:
an artificial chest including a first hollow compartment representing a first hemithorax, a second hollow compartment representing a second hemithorax, and a third hollow compartment representing a pericardium, the first and second hollow compartments being separated by a barrier that includes at least two layers;
a first pressurization device that is operatively connected to the first and second hollow compartments such that the first hollow compartment, the second hollow compartment, or both the first and second hollow compartments are pressurizable by infusion of a fluid via the first pressurization device;
a second pressurization device that is operatively connected to the third hollow compartments such that the third hollow compartment is pressurizable by infusion of a fluid via the second pressurization device;
a first bladder disposed between the two layers of the barrier, the bladder containing a fluid;
a second bladder located in the third hollow compartment; and
at least one channel having a first lumen connected to the first bladder and a second lumen connected to the second bladder, the at least one channel extending into an artificial neck,
wherein the first bladder is compressible via pressure exerted on the first bladder by at least one of the first and second hollow compartments such that the fluid flows into the first lumen of the at least one channel, thereby simulating jugular vein distension,
wherein the second bladder is compressible via pressure exerted on the second bladder by increased pressure in the third hollow compartment such that the fluid flows into the second lumen of the at least one channel, thereby simulating jugular vein distension, and
wherein the third hollow compartment is separated from the first hollow compartment by a non-stretching, air-tight barrier such that pressure in the third compartment is not influenced by pressure changes in the first and second hollow compartments.

* * * * *

UNITED STATES PATENT AND TRADEMARK OFFICE
CERTIFICATE OF CORRECTION

PATENT NO. : 9,589,483 B2  
APPLICATION NO. : 14/209341  
DATED : March 7, 2017  
INVENTOR(S) : Robert F. Buckman Page 1 of 1

It is certified that error appears in the above-identified patent and that said Letters Patent is hereby corrected as shown below:

On the Title Page

Item 57 (Abstract)

Line 3, please replace "the" with --The--

Line 4, please replace "the" (second occurrence) with --The--

Signed and Sealed this  
Sixth Day of June, 2017

Michelle K. Lee  
*Director of the United States Patent and Trademark Office*